United States Patent
Hu (10) Patent No.: US 12,481,610 B1
(45) Date of Patent: Nov. 25, 2025

(54) ACCELERATION DEVICE ARCHITECTURE FOR NEAR I/O PIPELINE COMPUTING AND AI ACCELERATION SYSTEM

(71) Applicant: StorageX Technology Inc., Wuxi (CN)

(72) Inventor: Jingming Hu, Wuxi (CN)

(73) Assignee: StorageX Technology Inc., Wuxi (CN)

( * ) Notice: Subject to any disclaimer, the term of this patent is extended or adjusted under 35 U.S.C. 154(b) by 0 days.

(21) Appl. No.: 18/884,533

(22) Filed: Sep. 13, 2024

Related U.S. Application Data (63) Continuation of application No. PCT/CN2024/104932, filed on Jul. 11, 2024.

(30) Foreign Application Priority Data

May 22, 2024 (CN) .......................... 202410634746.1

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 8,738,860 B1 * | 5/2014 | Griffin | G06F 12/0897 711/122 |
| 11,604,748 B2 * | 3/2023 | Peng | G06F 13/1689 |
| 2002/0040429 A1 * | 4/2002 | Dowling | G06F 9/3814 712/228 |
| 2020/0326889 A1 | 10/2020 | Norman et al. | |
| 2024/0126555 A1 | 4/2024 | Gayen et al. | |
| 2024/0127392 A1 | 4/2024 | Hughes et al. | |

FOREIGN PATENT DOCUMENTS

| | | |
|---|---|---|
| CN | 107066239 A | 8/2017 |
| CN | 117951346 A | 4/2024 |

OTHER PUBLICATIONS

First Office Action issued in counterpart Chinese Patent Application No. 202410634746.1, dated Jun. 26, 2024.

* cited by examiner

*Primary Examiner* — Michael Sun
(74) *Attorney, Agent, or Firm* — Westbridge IP LLC (57) ABSTRACT

Disclosed are an acceleration device architecture for near I/O pipeline computing and an AI acceleration system. A multi-channel direct access module includes N DRAM controllers connected to DRAMs in one-to-one correspondence; each DRAM controller is connected to at least K DMA controllers and connected to a corresponding core cluster by the DMA controllers; a pipeline synchronous loop is connected to N core clusters and includes M cascaded forward steps and M cascaded backward steps, and the forward step at a head end and the forward step at a tail end are connected to a receiver and a sender, respectively; an output of the forward step at the tail end is cascaded with a first backward step; an $i^{th}$ forward step and an $M-i^{th}$ backward step correspond to each other and are jointly connected to at least one computing core group.

12 Claims, 8 Drawing Sheets

ACCELERATION DEVICE ARCHITECTURE FOR NEAR I/O PIPELINE COMPUTING AND AI ACCELERATION SYSTEM

CROSS-REFERENCE TO RELATED APPLICATIONS

This application is a continuation of International Application No. PCT/CN2024/104932, filed on Jul. 11, 2024, which claims priority to Chinese Patent Application No. 202410634746.1, filed on May 22, 2024. The disclosures of the above-mentioned applications are hereby incorporated by reference in their entireties.

TECHNICAL FIELD

Embodiments of the present application relate to the field of acceleration devices, and in particular to an acceleration device architecture for near I/O pipeline computing and an AI acceleration system.

BACKGROUND

Figure 1:
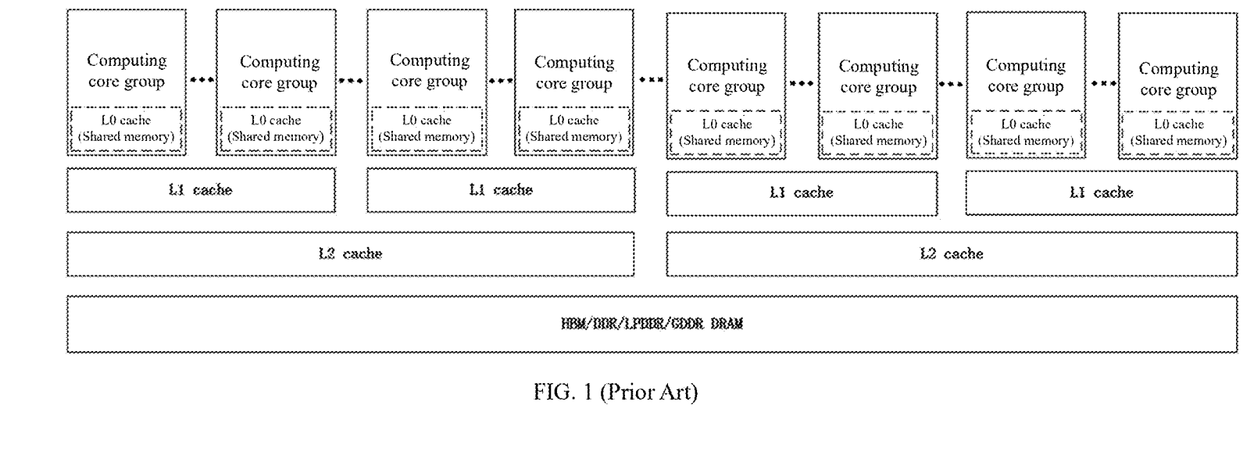
FIG. 1 is a computing core group storage acceleration architecture with multi-stage cache disclosed in the related art.

In graphics processing unit (GPU), system-on-chip (SoC), and application-specific integrated circuit (ASIC) designs, the interaction between the computing core and storage generally follows the architecture depicted in FIG. 1. Specific designs may fine-tune this architecture, resulting in variations in the number of cache layers. For instance, in the Ampere architecture of the A100 high-end graphics card, the original L0 layer is merged into the L1 layer. In this architecture, the L1 cache is in the kilobyte (KB) range, with capacities up to hundreds of KB. For example, the A100 graphics card features a 192 KB L1 cache, while the H100 graphics card has a 256 KB L1 cache. The L2 cache is in the megabyte (MB) range, with capacities reaching several tens of MB—50 MB for both the A100 and H100 graphics cards. Dynamic random-access memory (DRAM), on the other hand, typically offers gigabyte (GB) level capacities. To meet speed requirements, high-bandwidth memory (HBM) and graphics double data rate (GDDR) are commonly used, with capacities ranging from several GB to several tens of GB. For example, NVIDIA's recently launched B200 offers a substantial 192 GB of HBM.

SUMMARY

In the related art, parameters for artificial intelligence (AI) computing are typically initially stored in DRAM within a computer and must be loaded into a computing core for processing. As illustrated in FIG. 1, the computing core retrieves parameters from various cache levels, starting with the closest cache. If the parameters are not found in the current cache (a "miss"), the system queries progressively higher-level caches until the parameters are located and data is returned. Depending on the design, data may be sent directly to the computing core, or it might first need to be synchronized with the next cache level until with the L0/L1 cache level before being accessible to the computing core. When a miss occurs in the L0/L1 cache, the latency for parameter retrieval can be significantly prolonged. This issue is exacerbated by the fact that parameter reading is a one-time operation, but AI computing with large models requires continuous execution, leading to accumulated latency. Additionally, limited cache capacity can result in frequent access to higher-level caches or even DRAM, further intensifying the storage access bottleneck.

Embodiments of the present application provide an acceleration device architecture for near I/O pipeline computing and an AI acceleration system that address latency issues caused by multi-stage cache access in computing core groups in acceleration devices and acceleration systems.

The present application discloses an acceleration device architecture for near I/O pipeline computing; an acceleration device comprises a multi-channel direct access module, M computing core groups, and a pipeline synchronous loop; wherein the M computing core groups are divided into N core clusters comprising the same or different numbers of core groups.

The multi-channel direct access module comprises N DRAM controllers connected to external DRAMs in one-to-one correspondence; each DRAM controller is connected to at least K direct memory access DMA controllers and connected to a corresponding core cluster by the DMA controllers, data in an $i^{th}$ DRAM is directly read into an $i^{th}$ computing core cluster, and result data output by the $i^{th}$ computing core cluster is directly cached to the $i^{th}$ DRAM.

The pipeline synchronous loop is connected to the N core clusters and comprises M cascaded forward steps and M cascaded backward steps, and output of the forward step at a tail end is cascaded with a first backward step.

An $i^{th}$ forward step and an $M-i+1^{th}$ backward step correspond to each other and are jointly connected to at least one computing core group, data is pipelined to a target computing core group for computing and data output by the computing core group is fed into the pipeline synchronous loop; wherein M, N, K, i and j are positive integers.

Specifically, the multi-channel direct access module further comprises a Switch arbiter, the N DRAM controllers and the N core clusters are separately connected to a port of the Switch arbiter by ports, the data in the $i^{th}$ DRAM is cross-read into a $j^{th}$ core cluster, and result data output by the $j^{th}$ core cluster is cross-cached to the $i^{th}$ DRAM; wherein i and j are different positive integers.

Specifically, the K DMA controllers are in one-to-one connection, one-to-many connection, or many-to-one connection with the computing core groups in the computing core clusters.

Specifically, the acceleration device further comprises a sender and a receiver connected to the pipeline synchronous loop; the sender receives data output from the pipeline synchronous loop and sends the data out of the acceleration device, and the receiver receives data sent from outside, feeds the data into the pipeline synchronous loop and directs the data to a target computing core group in the core cluster.

Specifically, the backward step comprises a backward register and P cascaded backward write steps; P is a positive integer; the backward register is connected to an output end of a previous cascaded step to receive and register intermediate data; one output branch of the backward register is connected to a first backward write step and data is pipelined to a target backward write step by a cascade structure, and the other output branch is directly connected to a next cascaded step and the intermediate data is pipelined to a target step.

Specifically, first write registers in all the backward write steps in the same backward step are cascaded, and data is input by the backward register and pipelined to different backward write steps; the backward write step comprises at least Q cascaded write registers, and each write register is connected to one computing core group and data is pipelined to a target computing core group in the backward write step.

Specifically, the forward step comprises a forward first-in-first-out cache (FIFO), a forward register, and P groups of forward receive steps and forward write steps; P is a positive integer; P forward receive steps are cascaded, P forward write steps are cascaded, and the forward write step and the forward receive step in the same group are connected to the same computing core group; one input end of the forward FIFO is connected to output of a previous cascaded step to receive and register intermediate data, and the other input end is connected to output of the forward receive step at a tail end to receive data output from the forward receive step at the tail end; output of the forward FIFO is connected to the forward register, and output of the forward register is connected to a first forward write step and pipeline data is directed to a target forward write step by a cascade structure.

Specifically, the forward write step comprises at least Q cascaded write registers, and each write register is connected to one computing core group and data is pipelined to a target computing core group in the forward write step; the forward receive step comprises at least Q cascaded switch FIFOs, and each switch FIFO is connected to one computing core group, caches intermediate data input by the computing core group and pipelines the intermediate data into the pipeline synchronous loop layer by layer.

Specifically, first write registers in all the forward write steps in the same forward step are cascaded, and data is input by the forward register and pipelined to different forward write steps; switch FIFOs at tail ends of all the forward receive steps in the same forward step are cascaded and intermediate data input by different computing core groups are pipelined into the forward FIFO layer by layer.

Specifically, in the $i^{th}$ forward step and the $M-i+1^{th}$ backward step, the forward write step and the backward write step in the same group have the same structure; in the forward receive step and the forward write step of the same group in the same forward step, the number of the registers is the same as that of the FIFOs.

Specifically, data directed into the pipeline synchronous loop is provided with a bit identifier, and the forward steps and the backward steps determine, based on a corresponding flag bit of the bit identifier, status and a flow direction of the data; if the flag bit of the bit identifier indicates that the data is exhausted, the data is directly discarded; if the flag bit of the bit identifier indicates that the data is not exhausted, the data is fed into the write register layer by layer until the data is directed into a target computing core group.

In another aspect, the present application provides an AI acceleration system, which comprises at least two acceleration devices described in the above aspect and a data switching circuit, wherein the at least two acceleration devices are separately connected to several DRAMs, a sender and a receiver connected to a pipeline synchronous loop are provided in the acceleration device, and the sender and the receiver are separately connected to the data switching circuit; a computing core group in the acceleration device is configured for executing at least one of a matrix operation and a vector operation, the acceleration device at a sending end executes a data accelerating task and sends matrix data and/or vector data to the data switching circuit by the sender, and the acceleration device at a receiving end receives the matrix data and/or the vector data by the receiver and executes a data accelerating task.

The beneficial effects brought by the technical solution provided by the embodiments of the present application at include the following: cascaded forward steps and cascaded backward steps form a pipeline transmission structure, and the forward step is split into cascaded forward receive steps and cascaded forward write steps according to input and output, respectively; each forward receive step employs a multi-stage FIFO cascade and is connected to a computing core group, and each forward write step uses a multi-stage register cascade and is connected to the computing core group; this design facilitates high concurrent data input and output; in each step, first registers in adjacent write steps are cascaded, and FIFOs at the tail ends in adjacent receive steps are cascaded, such that input and output data can be pipelined between the write steps and the receive steps as well as directed inside the write steps and the receive steps in a pipeline jump manner, thereby enabling rapid transmission of the data.

In the acceleration device, direct access between core clusters consisting of the computing core groups and an external storage medium can be achieved by multi-channel DMA control. This approach accelerates data extraction and transmission efficiency, allowing data in the DRAM to be read into the computing core group or the data output by the computing core group to be received and written back into the DRAM; for data interaction across the core clusters and the DRAMs, a Switch arbiter is provided to achieve global data cross communication between the DRAMs and the core clusters. By eliminating a multi-layer cache design, the overall cost of the acceleration device is reduced, and data is transmitted to a specified computing core with minimum latency, resulting in enhanced data processing speed of the acceleration device.

DETAILED DESCRIPTION OF THE EMBODIMENTS

To provide a clearer understanding of the objectives, technical solutions, and advantages of the present application, the embodiments of the present application will be further described in detail below with reference to the accompanying drawings.

The term "plurality" mentioned herein refers to two or more. The term "and/or", when describing the relationship between associated objects, indicates that there can be three possible relationships. For example, "A and/or B" may represent three scenarios: A exists independently, both A and B exist simultaneously, or B exists independently. The character "/" generally represents an "or" relationship between the associated objects before and after it.

FIG. 1 is a computing core group storage acceleration architecture involving multiple layers of caches disclosed in the related art. For the computing core groups in the architecture, the designs of different products produced and designed by different companies are different and usually contain one computing core or a plurality of parallel computing cores. A computing core usually supports pipeline computing, and the computing functions of different computing cores may be different when a plurality of computing cores are comprised, such as simultaneously comprising computing cores of different precision and simultaneously comprising a matrix computing core (often MAC array) and a vector computing core. Taking A100 and H100 architectures as an example, one streaming multiprocessor (SM) corresponding to one L1 cache comprises four computing core groups, and each computing core group comprises a plurality of streaming processors (SPs). These SPs include different numbers of FP32 pipeline computing cores, INT32 pipeline computing cores, FP64 pipeline computing cores, and NVDIA self-defined tensor cores, where the tensor core in A100 is the third generation, and the tensor core in H100 is the fourth generation. Taking the architecture disclosed in FIG. 1 as an example, in some designs, the layer L0 caches are merged into the core groups as shared memory, while L1 and an upper layer are located outside the core groups. Several core groups share one L1 cache to perform parameter access, while a plurality of L1 caches and upper layer L2 cache perform parameter access. A plurality of L2 caches are finally connected to the storage medium for storing the module and data parameters, which may be specifically HBM, double data rate (DDR), low-power double data rate (LPDDR), GDDR DRAM or the like.

From the above architecture, it can be seen that when a current AI computing chip is designed, the requirements of a convolutional neural network (CNN) are often considered. A parameter is composed of convolution kernels at most; one convolution kernel can slide on data to be computed after being imported and perform a convolution operation, and one convolution operation may be understood as one multiply-accumulate operation (MAC operation) for one parameter. One convolution kernel in the CNN participates in multiple operations, and the computing density of a unit parameter is high. Taking resnet50 as an example, one convolution kernel in the first layer of convolution convolves a 224×224 input into a size of 112×112 with a convolution kernel of 7×7 and a stride of 2, and the number of convolution computing is 112×112=12544. It can be considered that each parameter has been subjected to 12544 times of computing (MAC computing) after being read, thus obtaining the current result. Much computing may occur after CNN parameters are read. If the next group of parameters are imported in the presence of the computing latency, the latency produced by the multiple layers of caches can be hidden, and meanwhile it is ensured that the next computing can be started as soon as possible.

However, as the success of generative pre-trained transformer (GPT) drives more and more applications of a large model based on the Transformer architecture, the computing requirements have changed. For the Transformer, the parameters are mainly large matrices, and the computing where the parameter is most involved may be abstracted as that vector multiplied by matrix equals vector:

$$F(y) = x * w$$

where x is an m-dimensional vector, w is a matrix of m×n, and y is an n-dimensional vector, and for the element $y_k$ of y ($k \in [1, n]$):

$$y_k = \sum_{i=1}^{m} x_i * w_{i,k}$$

As can be seen from the formula, each parameter data only participates in one multiply-accumulate operation, the computing density is low, and the computing core easily meets this performance requirement. Meanwhile, model parameters under the Transformer architecture are large. Taking LLaMa2 at the present stage as an example, the minimum model is 7 B, i.e., the parameter amount is about 7 billion. The storage capacity required by the parameters of FP32 is about 28 GB. Even if the parameters are quantized to int8, 7 GB is required. The above results in the situation that the operating performance of the Transformer architecture model on the AI acceleration device is directly related to the DRAM capacity and the throughput and latency involved in DRAM parameters' directly reaching the computing core. However, caches of the AI acceleration device with the current architecture are far from providing enough capacity. The parameter acquisition by the computing core is equal to directly reading the DRAM, and at this time, the latency brought by the multi-layer cache architecture seriously influences the computing performance. Although multi-batch computing (multi-task parallel) increases the utilization rate of computing resources to some extent, the performance loss caused by low utilization rate of the physical bandwidth is still not relieved.

The insufficient cache capacity will also bring more problems. Taking the softmax optimization in the GPU as an example, for the softmax, at least 3 times of loops are comprised in the pseudo code written for the function of preventing overflow. The use of the loops needs to cache intermediate results, which takes up the cache that is already not much, especially in the case that a long-dimensional model like Transformer is used (softmax may reach ten K level or at least K level, depending on the length of the support token). Meanwhile, for the multi-kernel parallel operation of the GPU, the data synchronization between the kernels also increases the latency overhead outside the algorithm. For the above defects, many optimization codes in the CNN era adopt an online softmax algorithm to implement optimization. By combining the computing formula for the attention in the attention layer and also utilizing the splittable characteristic of exponential function (exp), a flash attention scheme is formed to further reduce the loops.

Figure 2:
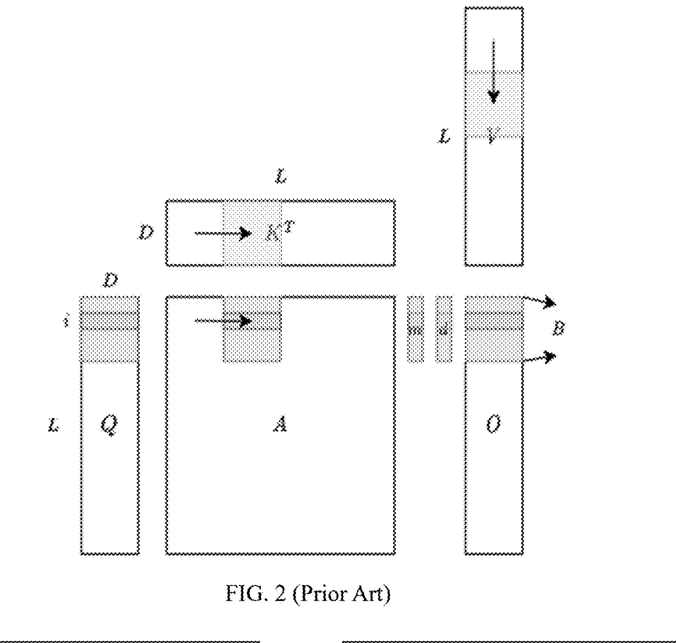
FIG. 2 is a schematic diagram of hardware deployment based on a flash attention scheme in the related art.

FIG. 2 is a schematic diagram of hardware deployment based on a flash attention scheme in the related art. The shadow portion in FIG. 2 is data that needs to be stored by the L0/L1 cache closest to a computing core group, and an additional framed portion in the shadow portion identifies valid data (for example, in A, the maximum cache amount generated by the intermediate result is the shadow portion, and the accumulated result is the framed portion therein). D is the dimension of head (usually small, e.g., 128 for LLaMa2), and B corresponds to parallelism B, which can be manually set. L is the sequence length and may be very long (such as 16 K). According to the current computing way, the matrix of the whole L sequence length is not required to be placed in the L0/L1 cache, and only the size of D×B needs to be considered. Pipeline exists between the tiles and the cache is small, and this way greatly solves the problem of parameter amplification. Such a computing way has certain restrictions.

Firstly, it is assumed currently that D is small, and this way is intended for better operation. D with the length equal to that of L in the original attention computing is segmented into current D by a multi-head attention computing way (D=L/n_heads, where n_heads is the number of heads in the multi-head attention). As the model evolves, it cannot be confirmed whether D will continue to become larger, which may become a restriction to the algorithm evolution direction. The decisive factor for controlling the parallelism B is the size of the cache, but for the parameter, what should generally be considered is the parallelism of the computing core. If a piece of hardware is given, the size of the cache is fixed, and the value of B×D is fixed. D in different models is different, and thus B that can be set is different. However, the parallelism of the computing core of the given hardware is fixed. In this case, the parallelism is mismatched, and the utilization rate of computing resources is greatly reduced.

In the generation phase of the inference, the essence of single-batch computing is the multiplication of vector and matrix, and Q is the vector. In AI computing core design, a systolic array is mostly adopted and is the multiplication of matrix and matrix, and more multi-batch operations are performed to increase the resource utilization rate. During operation, KT and V slide along with the sequence, and then Q needs to be stored completely. Q at a number equal to the batch number is stored in the multi-batch. At this time, due to the cache size restriction, there is also restriction to the batch number, further restricting the utilization rate of computing resources. All of the above two problems result in a severe restriction to the performance of the computing core with high computing density. Meanwhile, the flash attention only relieves and solves the worsening of the problem of access latency of the multi-layer cache, but does not improve the problem per se. The above KT and V sliding along with the sequence still need to access the DRAM by the multi-layer cache mechanism.

For the AI acceleration device constructed based on the above architecture, the device latency also exists among a plurality of devices, because before the appearance of Transformer, most of the AI computing only uses multi-device joint computing when training and the inference mostly runs in a single device. In the Transformer model, it is common to use a plurality of devices to jointly perform inference computing. For example, the llama2-70B model requires two or four A100/H100 to achieve better performance.

Figure 3:
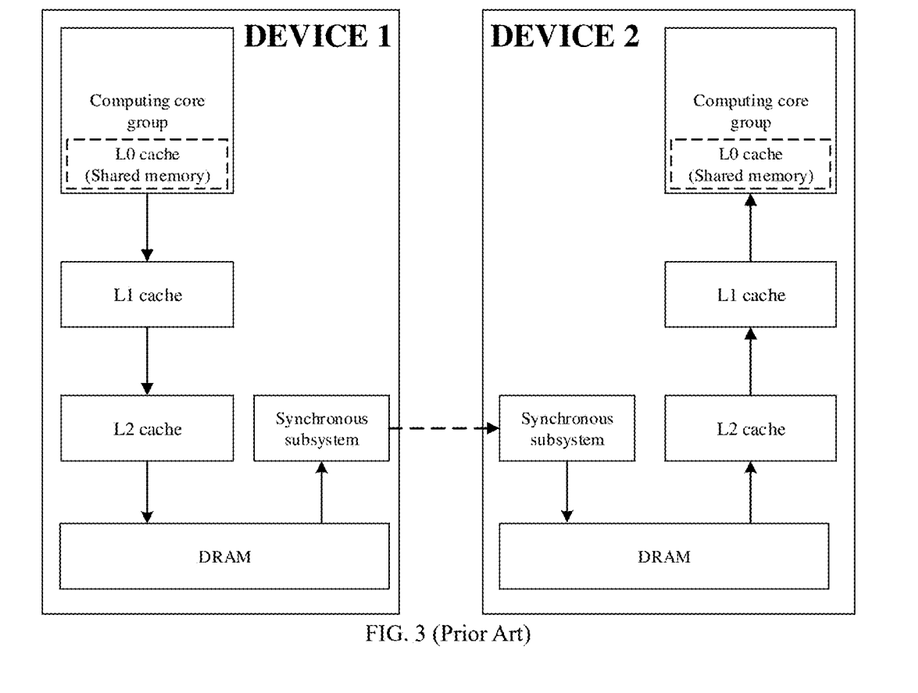
FIG. 3 shows a schematic diagram of a synchronous data stream based on the current AI acceleration device chip.

FIG. 3 shows a schematic diagram of a synchronous data stream based on the current AI acceleration device chip. When data is synchronized by the computing core groups in two devices, data in device 1 is transmitted to the DRAM through a multi-layer cache mechanism (e.g., two layers in FIG. 3) first and then transmitted to a target device (device 2) by a synchronous subsystem, and finally, the data in the DRAM of the target device reached the target computing core group through a multi-layer cache mechanism. In this way, without considering the inter-chip transmission and the DRAM latency, the multi-layer latency between the computing core group and the DRAM is usually 100 clock cycles or more, thus greatly affecting the efficiency. Meanwhile, within the device, if global data switching is performed, similar latency is also generated and thereby the computing efficiency is affected.

Figure 4:
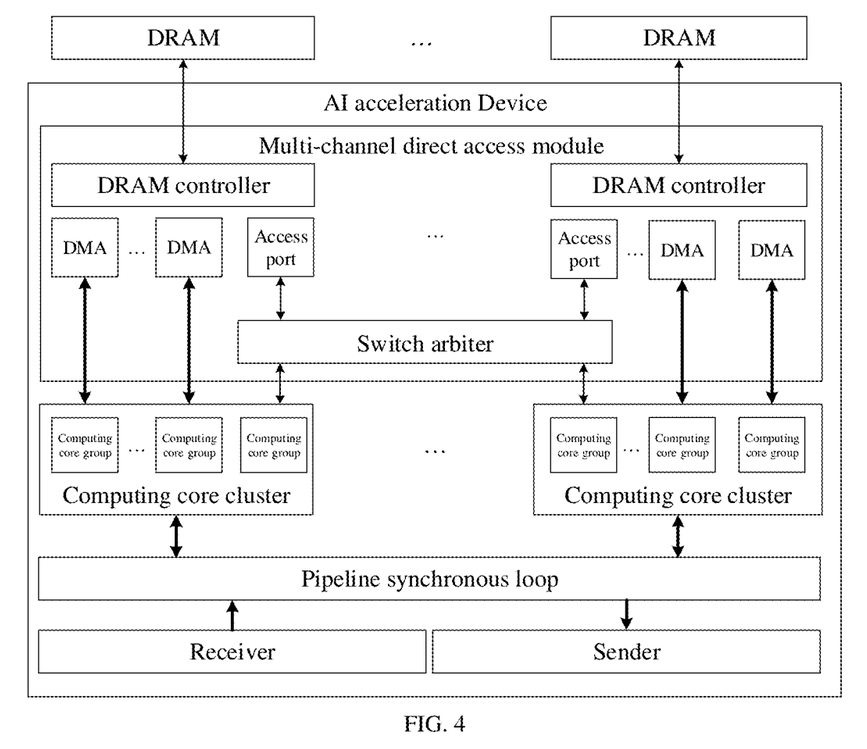
FIG. 4 is a schematic structural diagram of an acceleration device architecture for near I/O pipeline computing provided in an embodiment of the present application.

FIG. 4 is a schematic structural diagram of an acceleration device architecture for near I/O pipeline computing provided in an embodiment of the present application. Provided inside the AI acceleration device under this architecture are a multi-channel direct access module, M computing core groups, and a pipeline synchronous loop. The M computing core groups are divided into N core clusters comprising the same or different numbers of core groups. The core clusters are designed mainly to centralize several computing core groups, and can specifically achieve the accelerating task with a higher level of integration and a larger scale.

The multi-channel direct access module comprises N DRAM controllers connected to external DRAMs in one-to-one correspondence. The N DRAM controllers are set according to actual requirements and externally connected to a certain number of storage devices, such that data reading and writing operations for the DRAMs are achieved. In order to accelerate the data transmission efficiency and reduce the control dependence on the computing core groups, each DRAM controller may be connected to at least K direct memory access DMA controllers and connected to a corresponding core cluster by the DMA controllers. As such, data in an $i^{th}$ DRAM is directly read into an $i^{th}$ computing core cluster, and result data output by the $i^{th}$ computing core cluster is directly cached to the $i^{th}$ DRAM.

Each DRAM controller corresponds to a plurality of DMA access channels and is directly connected to the corresponding core cluster, so that rapid direct access can be achieved, and the latency caused by the multi-layer cache mechanism is eliminated. In addition, the latency of switch arbitration, bus forwarding and the like can be eliminated, and the physical performance of the DRAM can be exerted to the maximum extent. That is because the invocation of the common access port requires constant invocation of the resources of the computing core groups for controlling.

It should be noted that the type of the controller in the multi-channel direct access module may be determined according to the design of the AI acceleration chip. The HBM is currently preferred by the mainstream, but the GDDR, DDR, LPDDR and other controllers may also be adopted because of the process, availability, historical technology and the like. In addition, in the present application, the whole core cluster is directly connected to the DMA channel, and the number and the scale of the computing core groups in the core clusters corresponding to different DRAMs may be designed according to the design ideas of different designers and the design of the target scenes. The relationship between the DMA channels and these computing core groups may be defined as one-to-one, one-to-many, many-to-one, and the like according to the requirements. In principle, a many-to-many relationship is not encouraged and supported because it may reduce the access efficiency.

In one possible implementation, a one-to-one design may be used, i.e., the number of the DMAs is the same as that of the computing core groups within the core cluster; the DMA controller also needs to set the same number of the common access ports to be connected to all computing core groups, and this is mainly for performing data switching and executing the accelerating task across the core clusters and the DRAM devices. Therefore, the present application further provides a switch arbiter in the multi-channel direct access module.

The switch arbiter is separately connected to the N DRAM controllers and the N core groups by the common access ports. The purpose is to allow the data in the $i^{th}$ DRAM to be cross-read into a $j^{th}$ core cluster and allow the result data output by the $j^{th}$ core cluster to be cross-cached to the $i^{th}$ DRAM. The i and the j are different positive integers. Each DRAM controller corresponds to one common access channel. The unified access of the common channels between the controllers is achieved by one switch and an access port is provided for each computing core cluster. The design provides a global access channel for the computing core groups. The speed of the channel is relatively slow compared with that of the DMA channel, but the latency in global data switching is still better than that in switching by a multi-layer cache mechanism.

In addition, in some embodiments, if the acceleration device wants to perform effective data switching with other peripheral devices, a sender and a receiver may be further provided. The sender and the receiver are separately connected to the pipeline synchronous loop. After the data computed by the accelerated computing core is directed by the pipeline synchronous loop, the result may be sent from the sender to the outside of the acceleration device. Similarly, data from the outside may also be received by the receiver, fed into the pipeline synchronous loop, and then directed to the target computing core group in the core cluster.

Figure 5:
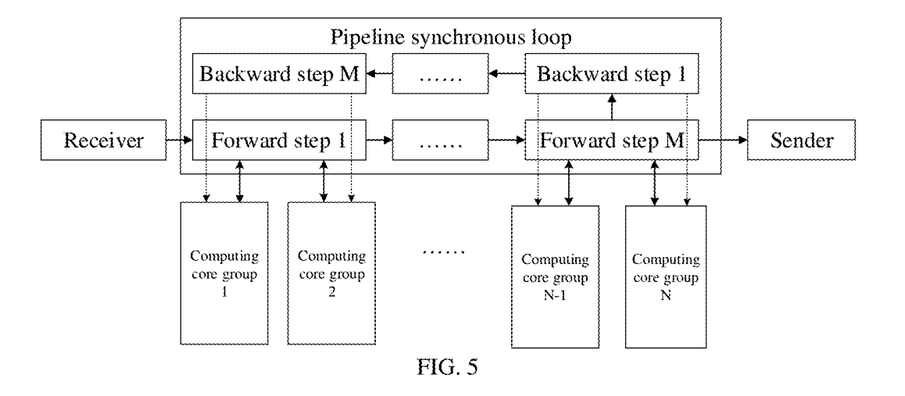
FIG. 5 is a schematic structural diagram of a pipeline synchronous loop.

FIG. 5 is a schematic structural diagram of a pipeline synchronous loop. The pipeline synchronous loop is connected to N core clusters and comprises M cascaded forward steps and M cascaded backward steps. The forward steps are configured to forward direct data transmission, and the backward steps are configured to backward direct data transmission. Particularly, the forward step at the head end and the forward step at the tail end are connected to the receiver and the sender, respectively. Certainly, the positions of the receiver and the sender may be exchanged, or the sender and the receiver are respectively arranged at the head end and the tail end of the cascaded backward steps, which does not influence the whole structure. The forward and backward steps constitute a cascade structure together, i.e., the output of the forward step at the tail end is cascaded with the first backward step. For example, in FIG. 5, a forward step 1 is connected to the receiver, the forward steps are forwardly and sequentially connected until a forward step M, and the forward step M is connected to the sender for outputting. Meanwhile, the forward step M is further cascaded with a backward step 1 and then the backward steps are backwardly and sequentially connected until a backward step M. It should be noted that the forward and backward steps do not completely form a ring; M, N, K, i, and j are positive integers.

An $i^{th}$ forward step and an M−i+1$^{th}$ backward step of the pipeline synchronous loop correspond to each other and are jointly connected to at least one computing core group. That is, in FIG. 5, the forward step 1 and the backward step M correspond to each other, the forward step M and the backward step 1 correspond to each other, and so on for the steps in between. Each forward step i and each backward step M−i+1 as one group should be connected to the same computing core group. The number of the computing core groups connected to each group can be freely set. For example, if N computing core groups are equally divided among M groups, the number of the computing core groups in each group is N/M.

The purpose of the design structure is to pipeline data to the target computing core group for computing and feed the data output by the computing core group into the pipeline synchronous loop. Under the action of the forward and backward steps, data fed from any one computing core group may be pipelined to any other computing core group by the steps, and the special structure featuring repeated folding of cascaded forward and backward steps can enable data to be gradually directed from the computing core group 1 to the computing core group N and then directed from the computing core group N back to the computing core group 1. Similarly, the receiver and the sender can achieve data switching between acceleration devices; the data from the outside is received and then directed and computed, and then the result data or intermediate data resulting from pipeline computing is sent out. This is also the core significance of the "synchronous loop" in the present application.

Figure 6:
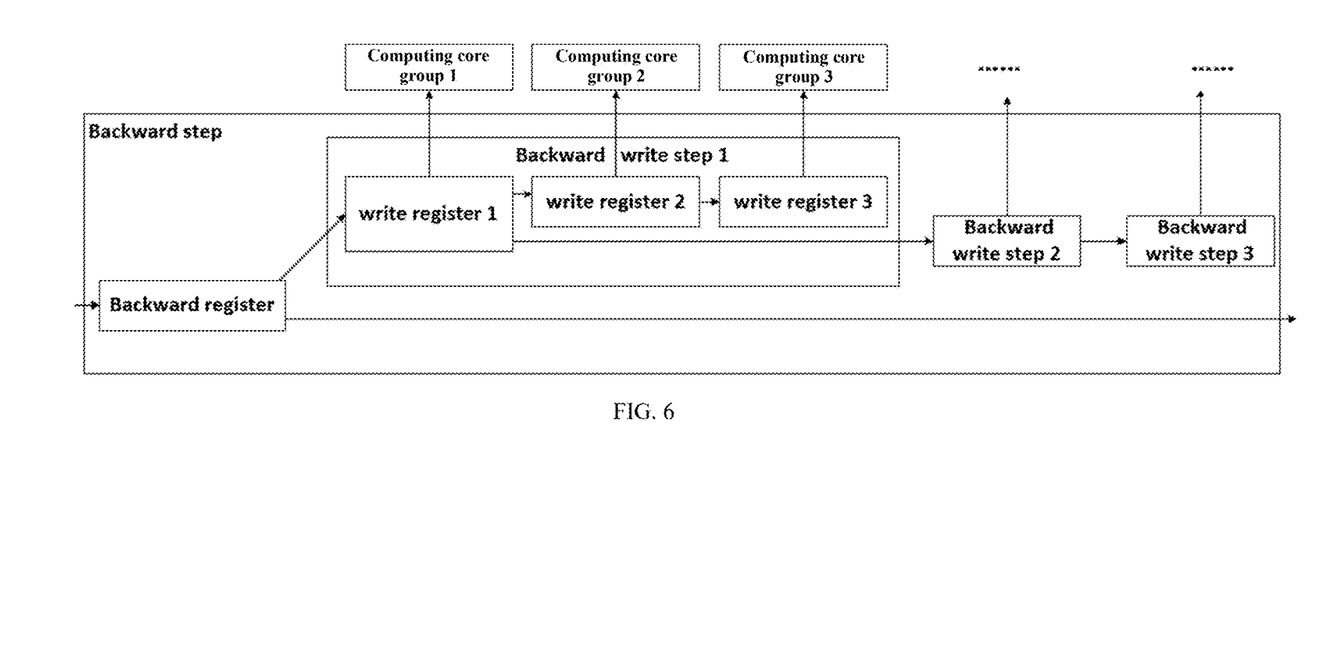
FIG. 6 is a schematic structural diagram of a backward step in a pipeline synchronous loop.

FIG. 6 is a schematic structural diagram of a backward step in a pipeline synchronous loop. The backward step comprises a backward register and P cascaded backward write steps, where P is a positive integer. Three backward write steps are illustrated in FIG. 6 for ease of description.

The backward register is connected to an output end of a previous cascaded step to receive and register intermediate data. One output branch of the backward register is connected to the first backward write step (write step 1) and the data is pipelined to a target backward write step by a cascade structure, and the other output branch is directly connected to a next cascaded step and the intermediate data is pipelined to a target step. Assuming that the intermediate data needs to be sent to a computing core group 4 in a write step 2, the intermediate data needs to be sent to the write step 1 first and then transmitted to the write step 2.

First write registers in all the backward write steps in the same backward step are cascaded; data is input by the backward register and pipelined to different backward write steps. The backward write step comprises at least Q cascaded write registers, and each write register is connected to one computing core group and the data is pipelined to a target computing core group in the backward write step. The architecture is special in that the continuous storage of the registers will take up clock cycles and cause latency, so the first write registers (write registers 1) in all the backward write steps are cascaded. Assuming that the intermediate data is to be directed to a computing core group 8 in a write step 3, the data is directed in a pipeline jump manner, namely backward register→(backward write step 1) write register 1→(backward write step 2) write register→(backward write step 3) write register 1, and then write register 1→write register 2→computing core group 8 within this layer. It should be particularly noted that the number of the registers (computing core groups) cascaded inside each write step may be the same or different and is set according to actual requirements.

Figure 7:
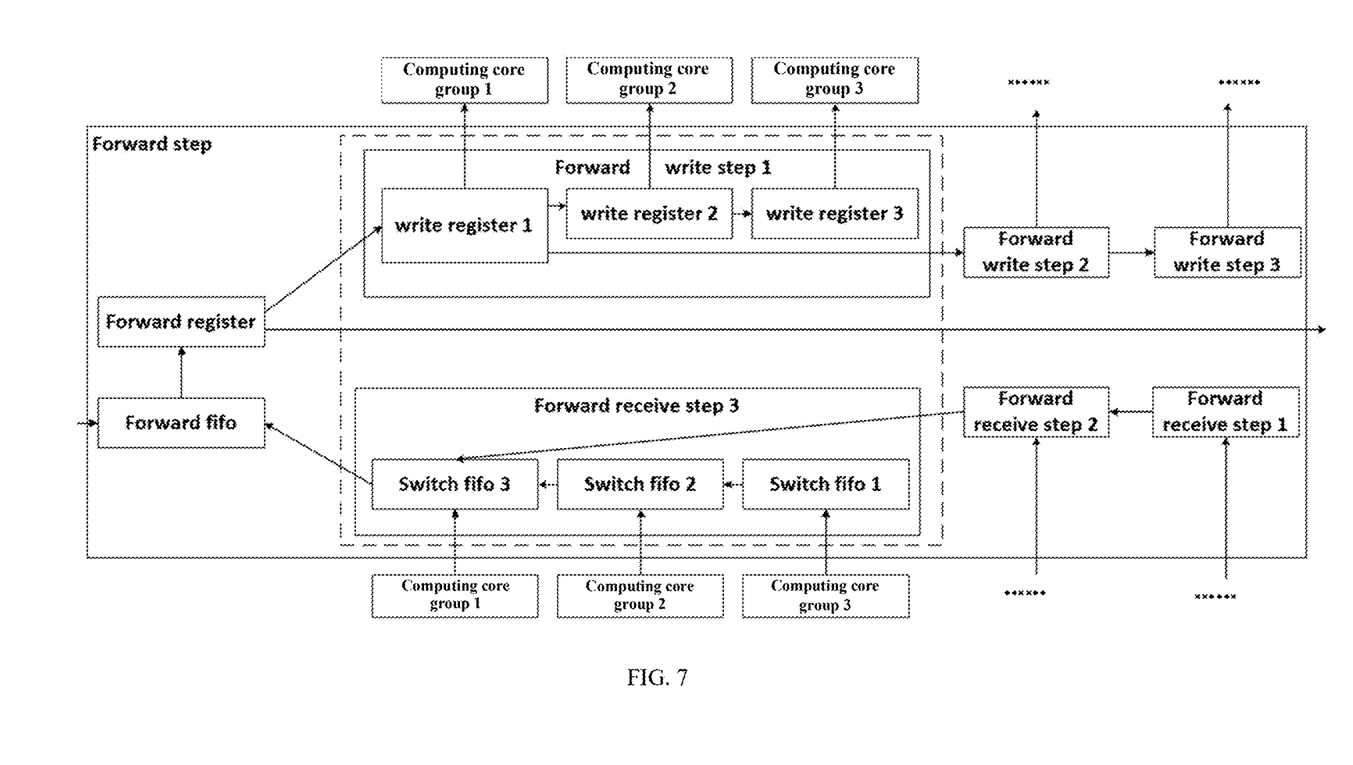
FIG. 7 is a schematic structural diagram of a forward step in a pipeline synchronous loop.

FIG. 7 is a schematic structural diagram of a forward step in a pipeline synchronous loop. The forward step comprises a forward fifo, a forward register, and P groups of forward receive steps and forward write steps, where P is a positive integer.

The P forward receive steps are cascaded, the P forward write steps are cascaded, and the forward write step and the forward receive step in the same group are connected to the same computing core group. The data flow directions are opposite since one is used for sending and the other is used for data receiving. For ease of description, the numbering is described using the pipeline time sequence, namely, the forward write step i and the forward receive step P−i+1 form a group, which corresponds to a group formed by a forward write step 1 and a forward receive step 3 in FIG. 7, and so on.

One input end of the forward fifo is connected to output of a previous cascaded step to receive and register intermediate data, and the other input end is connected to output of a forward receive step P at a tail end to receive data output from the $P^{th}$ forward receive step. An output of the forward fifo is connected to the forward register, and output of the forward register is connected to a first forward write step (forward write step 1) and the pipeline data is directed to a target forward write step by a cascade structure.

The forward write step comprises at least Q cascaded write registers, and each write register is connected to one computing core group; the purpose is to pipeline the intermediate data to a target computing core group in the forward write step.

The forward receive step comprises at least Q cascaded switch fifos, and each switch fifo is connected to one computing core group, caches intermediate data input by the computing core group and pipelines the intermediate data into the pipeline synchronous loop layer by layer.

In some embodiments, the forward step and the backward step may comprise multiple layers of the backward write steps and the forward receive steps, respectively. For example, in FIG. 7, the write register 1 in the forward write step 1 is not directly connected to the computing core group 1 downward, but connected to a forward write step 11, then the forward write step 11 also comprises Q write registers and each write register is connected to one computing core group, such that a multi-layer nested structure is formed, and the last layer is connected to the computing core group; the same applied to the other parts.

In the pipeline synchronous loop provided in the present application, first write registers (write registers 1) in the forward write steps in the same forward step are cascaded; data is input by the forward registers and pipelined to different forward write steps. Such a way can achieve the forward directing in a pipeline jump manner according to the final destination of the flow, reduce the data transmission process, quickly direct the (intermediate) data to the target forward write step, and then sequentially transfer the data to the target computing core group in the step.

Similarly, regarding the structure for inputting data, the forward receive steps Q at the tail ends in the forward receive steps in the same forward step are cascaded and pipeline the intermediate data input by different computing core groups into the forward fifo layer by layer. Such a way can achieve the forward directing of data in a pipeline jump manner and reduce the transmission process involving the FIFOs.

In particular, because the backward step i and the forward step M−i+1 are steps of the same group and maintain the same computing core group together, in the $i^{th}$ forward step and the M−i+1$^{th}$ backward step, the forward write step and the backward write step in the same group have the same structure. That is, the same number and structure of write registers are comprised, and in the forward receive step and the forward write step of the same group in the same forward step, the number of the registers is also the same as that of the FIFOs.

In the above step structure, the forward and backward write steps only store one piece of data, so this is a full pipeline case and the layer-by-layer transmission can be completed using the registers. Quality of service (Qos) control exists in the forward receive steps, which may cache an indefinite amount of multiple data. It is achieved with register+determination logic when the write data is transmitted at each clock cycle. When the data is received from the computing core group and transmitted to the main pipeline at each cycle, the fifo structure is used for caching to mainly solve the collision of two data sources. In a specific design, it should be noted that the closer to the main pipeline, the higher the data bandwidth cap should be designed. Meanwhile, for data sent by the computing core group, multiple paths of receive in the pipeline synchronous loop may arrive at the same time, so fifo is used for caching. In some applications, QoS restrictions may be added where necessary if it is expected that there will be relatively serious data stream collision.

Assuming that the pipeline synchronous loop is in a hierarchical form for computing, the uppermost layer is the structure of forward step 1—forward step M and backward step 1—backward step M; if only a single-layer register structure (and FIFO) is present inside the forward step and the backward step, the second layer is a structure of a single forward step and backward step, and the third layer is the computing core group. In FIGS. 5-7, a three-layer structure is used as an example for description. If the forward step and the backward step comprise a multi-layer-register structure, the pipeline layers of the whole synchronous loop increase accordingly. Assuming that the number of the pipeline layers is sync_layers, and the number of pipeline times of each layer is sync_steps (i.e., the Q value in the foregoing embodiment, which may be different in different units; FIGS. 6-7 are described by taking sync_layers=3 and sync_steps=3), the maximum number of supported computing core groups is as follows:

$$\text{sync\_steps}^{\text{sync\_layers}}$$

the minimum latency and the maximum latency in the device are as follows:

$$\text{latenc\_min} = \text{sync\_layers}$$
$$\text{lateny\_max} = \text{sync\_steps} * \text{sync\_layers}$$

Taking an A100 graphics card as an example, there are 108 computing core group SMs. At this time, a 3-layer-5-stage pipeline is adopted, 125 computing core groups may be supported at most, the minimum synchronization latency is 3 cycles, and the maximum synchronization latency is 15 cycles. Compared with the at least 100 synchronization cycles in the multi-stage cache mechanism, it has nearly hit about 10 cycles of the L1 cache and is even faster.

For the pipeline data directing rule of the pipeline synchronous loop above, in the data directing process, bit identification is used for determining whether to send the data to the next acceleration device or not and determining which computing core group inside receives the data. Specifically, the data directed into the pipeline synchronous loop is provided with a bit identifier, and the forward steps and the backward steps determine, based on a corresponding flag bit of the bit identifier, status and a flow direction of the data. Before the data is directed by one forward step and one backward step each time, determination is made, according to the flag bit of the bit identifier, regarding the data direction and whether the data is exhausted. If the data is exhausted, the data is discarded; if not, the transmission direction is determined and the data is directed. Each step is divided into a plurality of layers of pipeline to direct the data in shortest latency and shorten the bit identification length of the computing core group in the case that some chips are provided with many computing core groups.

In summary, in the present application, cascaded forward steps and cascaded backward steps form a pipeline transmission structure, and the forward step is divided into cascaded forward receive steps and cascaded forward write steps according to input and output, respectively; each forward receive step adopts a multi-stage FIFO cascade and is connected to a computing core group, and each forward write step adopts a multi-stage register cascade and is connected to the computing core group, achieving high concurrent data input and output; in each step, first registers in adjacent write steps are cascaded, and FIFOs at the tail ends in adjacent receive steps are cascaded, such that input and output data can be pipelined between the write steps and the receive steps as well as directed inside the write steps and the receive steps in a pipeline jump manner, thereby achieving rapid transmission of the data.

In the acceleration device, directly access between core clusters consisting of the computing core groups and an external storage medium can be achieved by multi-channel DMA control, the data extraction and transmission efficiency is accelerated, and data in the DRAM is read into the computing core group or the data output by the computing core group is received and written back into the DRAM; for data interaction across the core clusters and the DRAMs, a Switch arbiter is provided to achieve global data cross communication between the DRAMs and the core clusters. The acceleration device discards a multi-layer cache design mode, and therefore the overall cost is reduced, data is transmitted to a specified computing core with the minimum latency, and the data processing speed of the acceleration device is accelerated.

Figure 8:
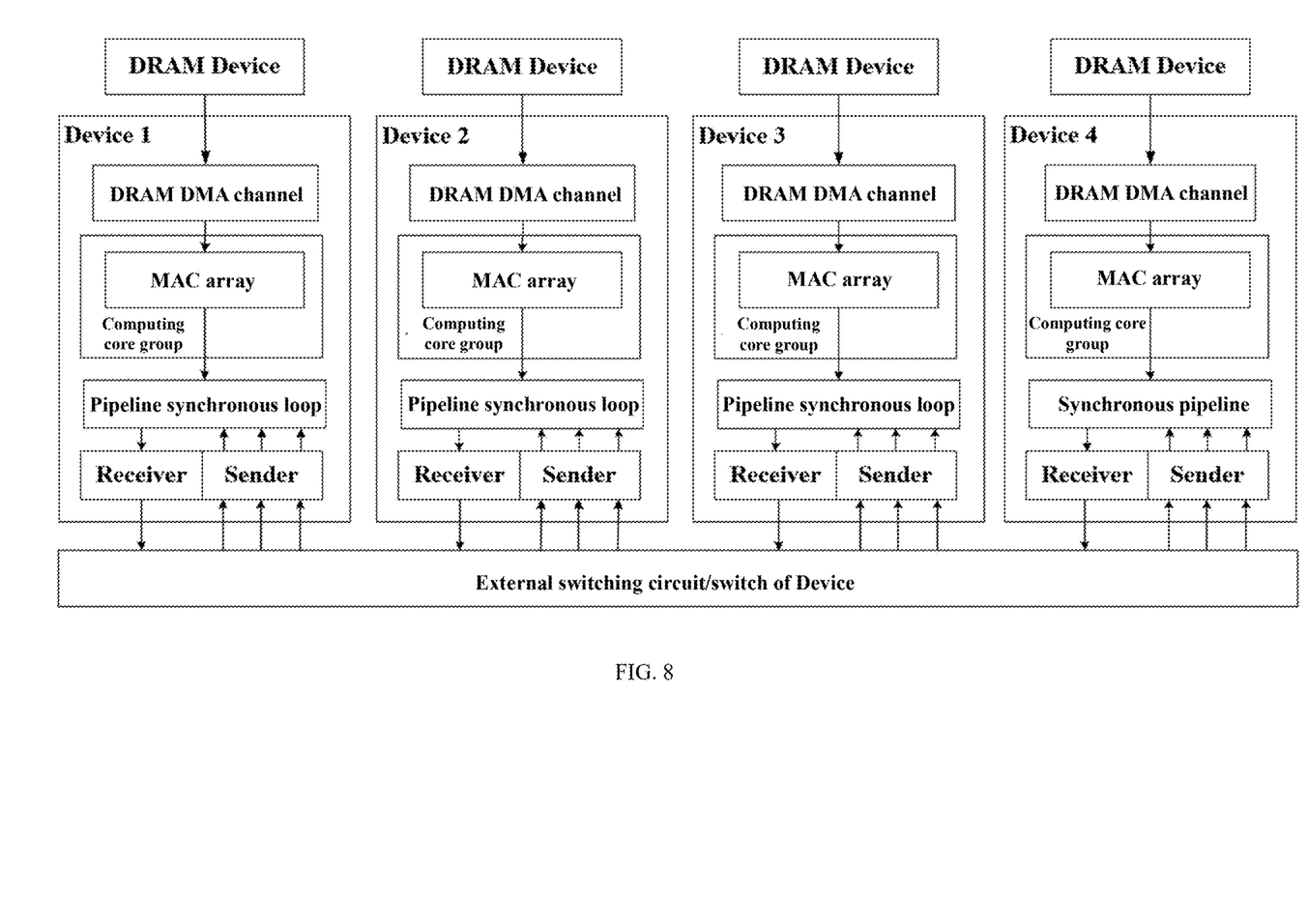
FIG. 8 is a schematic structural diagram of an AI acceleration system provided in the present application.

FIG. 8 is a schematic structural diagram of an AI acceleration system provided in the present application. The system comprises at least two acceleration devices as disclosed above and a data switching circuit. The at least two acceleration devices are separately connected to several DRAMs, and a sender and a receiver of the acceleration device are separately connected to the data switching circuit.

A computing core group in the acceleration device is configured for executing at least one of a matrix operation and a vector operation, the acceleration device at a sending end executes a data accelerating task and sends matrix data and/or vector data to the data switching circuit by the sender, and the acceleration device at a receiving end receives the matrix data and/or the vector data by the receiver and executes a data accelerating task.

Transformer (GPT, LLaMa, Gemini, and the like are all transformer architecture models) is taken as an example to explain the operation principles of the architecture and the system; the main computing of Transformer focuses on attention computing and linear computing.

Long Sequence Linear Computing

For a sequence computing, $O(k)=A(n)W(n, k)$, there may be different parallel computing methods according to the difference in the external topology, the number of AI acceleration devices (hereinafter referred to as device) in the system, vectors, and matrix dimensions.

In a scenario where the parallel partitioning is conveniently and completely computed according to A, assuming the system has 4 devices and each device has one computing core group, then (linear parallel acceleration 1):

$$O_1 = A(n)W\left(n, 0 \to \frac{k}{4} - 1\right)$$
$$O_2 = A(n)W\left(n, \frac{k}{4} \to \frac{k}{4}*2 - 1\right)$$
$$O_3 = A(n)W\left(n, \frac{k}{4}*2 \to \frac{k}{4}*3 - 1\right)$$
$$O_4 = A(n)W\left(n, \frac{k}{4}*3 \to k - 1\right)$$
$$O = (O_1, O_2, O_3, O_4)$$

In the design, matrix multiplication is generally completed by an MAC array, namely, computing core groups in a core cluster complete the matrix operation for the MAC array. 4 devices each extract data by DMA channels, and data receiving and sending are performed after the pipeline operation is executed by a pipeline synchronous loop. The 4 devices are simultaneously connected to an external switching circuit or a switch to package and send the data, and the system is mainly used in multi-device cooperative implementation of a model accelerating task.

Certainly, in a scenario of partitioning a relative long pipeline topology or A sequence, assuming the system has 2 devices and each device has two computing core groups, then (linear parallel acceleration 2):

$$O_1 = A\left(0 \to \frac{n}{4} - 1\right)W\left(0 \to \frac{n}{4} - 1, k\right)$$
$$O_2 = A\left(\frac{n}{4} \to \frac{n}{4}*2 - 1\right)W\left(\frac{n}{4} \to \frac{n}{4}*2 - 1, k\right)$$
$$O_3 = A\left(\frac{n}{4}*2 \to \frac{n}{4}*3 - 1\right)W\left(\frac{n}{4}*2 \to \frac{n}{4}*3 - 1, k\right)$$
$$O_4 = A\left(\frac{n}{4}*3 \to n - 1\right)W\left(\frac{n}{4}*3 \to n - 1, k\right)$$
$$O = O_1 + O_2 + O_3 + O_4$$

Figure 9:
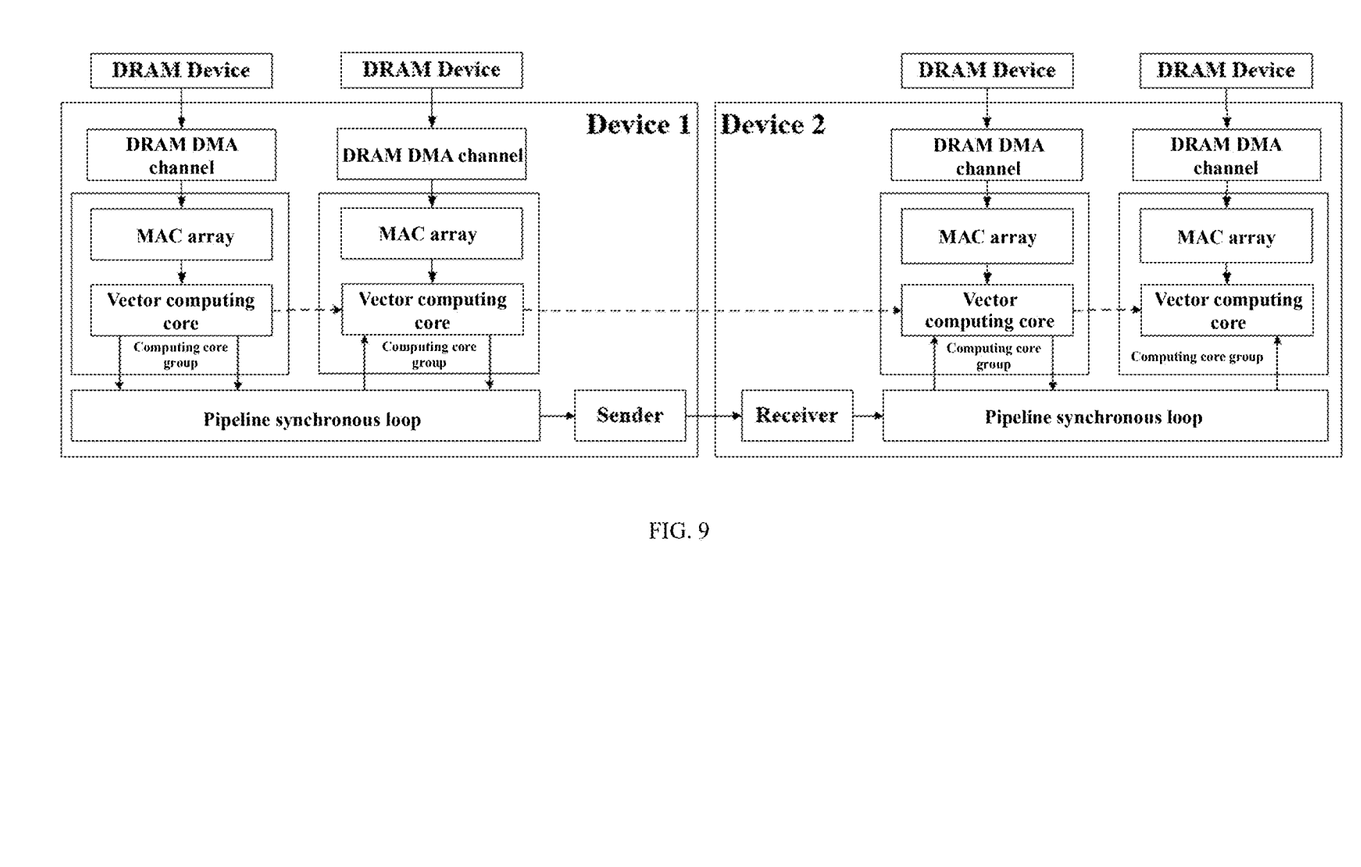
FIG. 9 is a schematic structural diagram of an AI acceleration system for long sequence linear computing.

The system structure corresponding to the scheme is as shown in FIG. 9. Because the vector addition operation is completed by a (computing core group) vector computing core, and because there are two devices, the switch or the switching circuit may be directly omitted, and a sender of one device is directly connected to a receiver of another device, thus achieving rapid data interaction between the devices.

Attention Computing

Figure 10:
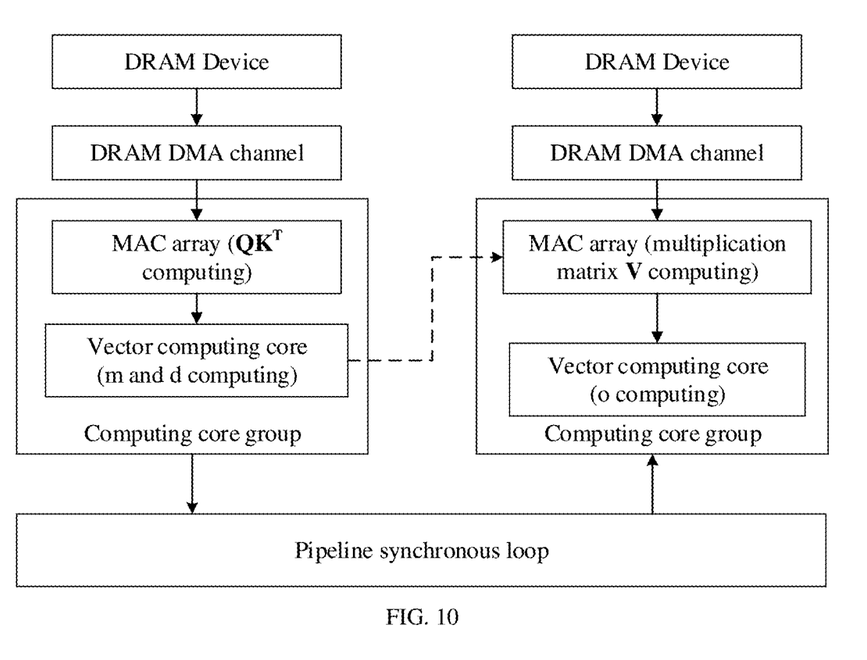
FIG. 10 is an AI acceleration device designed based on a flash attention computing principle.

For $O=softmax(QK^T)V$, the computing principle of the flash attention may be adopted algorithmically. When deployment is performed based on this architecture, the data stream may be further optimized. FIG. 10 is an AI acceleration device designed based on the flash attention computing principle. A core cluster is divided into two computing core groups, and each computing core group simultaneously comprises a matrix operation and a vector operation. One computing core group comprises a MAC array for $QK^T$ computing and a vector computing core for m and d computing, while the other computing core group comprises a MAC array for multiplication matrix V computing and a vector computing core for o computing. Because the execution of 0=softmax($QK^T$)V algorithm only needs two computing core groups, to better simplify the system structure, other structures are omitted, and only the input and the output of the two computing core groups are simultaneously connected to the pipeline synchronous loop to complete the attention computing. The main characteristics of the structural phase include the following:

parameters are directly computed by the MAC array without passing through a multi-layer cache mechanism;

data among the computing core groups are transmitted by a pipeline synchronous system (composed of single-device or multi-device multi-layer pipeline synchronous loop, senders, receivers, and the like), and cache-free pipeline transmission can be performed;

larger computing core groups (higher computing density) can be supported, and the total number of computing core groups needing synchronous interaction is reduced;

the setting of the parallelism is based on computing core group resources without considering the size of the cache, and the optimal performance can be exerted.

In summary, the system architecture has the following beneficial effects when applied in an AI model computing scenario.

Firstly, in an AI computing scenario involving large model parameters, especially when multi-device cooperation is required for operations and data are switched globally in the devices, the synchronization latency of data can be effectively reduced, and thereby the overall performance is improved;

Secondly, the architecture has less cache requirements, so that the device area can be effectively reduced on the basis of keeping computing power and DRAM storage capacity, and thereby the yield can be improved or the computing power density can be increased, either of which can achieve the goal of saving the cost;

Thirdly, the architecture is friendly in scale expansion, the performance is approximately linearly expanded along with an increase of the number of devices in the system, the cost performance of cluster deployment is high, and total cost of ownership (TCO) of a data center can be reduced especially when the requirement for large models increasingly grows;

Lastly, the architecture has strong adaptability, has small restrictions on the design of the computing core group, the design of the external connection mode and the like, and can exert the advantages of different designers in the prior art.

The above description illustrates preferred embodiments of the present application. It should be understood that the present application is not limited to the specific embodiments mentioned above. Any devices and structures that are not explicitly described should be considered as implemented in ordinary ways within the field. Those skilled in the art can make various changes and modifications to the present application or make amendments to create equivalent embodiments without departing from the technical solutions herein, and all of these variations do not affect the essence of the present application. Therefore, any simple amendments, equivalent changes and modifications made to the above embodiments according to the technical essence of the present application, which do not deviate from the technical solutions of the present application, still fall within the protection scope of the technical solutions of the present application.

What is claimed is:

1. An acceleration device architecture for near I/O pipeline computing, wherein the acceleration device comprises a multi-channel direct access module, M computing core groups, and a pipeline synchronous loop; the M computing core groups are divided into N core clusters comprising the same or different numbers of core groups;

the multi-channel direct access module comprises N dynamic random-access memory (DRAM) controllers connected to external DRAMs in one-to-one correspondence; each DRAM controller is connected to at least K direct memory access DMA controllers and connected to a corresponding core cluster by the DMA controllers, data in an $i^{th}$ DRAM is directly read into an $i^{th}$ computing core cluster, and result data output by the $i^{th}$ computing core cluster is directly cached to the $i^{th}$ DRAM;

the pipeline synchronous loop is connected to the N core clusters and comprises M cascaded forward steps and M cascaded backward steps, and output of the forward step at a tail end is cascaded with a first backward step; an $i^{th}$ forward step and an $M-i+1^{th}$ backward step correspond to each other and are jointly connected to at least one computing core group, data is pipelined to a target computing core group for computing and data output by the computing core group is fed into the pipeline synchronous loop; wherein M, N, K, i and j are positive integers.

2. The acceleration device architecture for near I/O pipeline computing according to claim 1, wherein the multi-channel direct access module further comprises a Switch arbiter, the N DRAM controllers and the N core clusters are separately connected to a port of the Switch arbiter by ports, the data in the $i^{th}$ DRAM is cross-read into a $j^{th}$ core cluster, and result data output by the $j^{th}$ core cluster is cross-cached to the $i^{th}$ DRAM; wherein i and j are different positive integers.

3. The acceleration device architecture for near I/O pipeline computing according to claim 2, wherein the K DMA controllers are in one-to-one connection, one-to-many connection, or many-to-one connection with the computing core groups in the computing core clusters.

4. The acceleration device architecture for near I/O pipeline computing according to claim 3, wherein the acceleration device further comprises a sender and a receiver connected to the pipeline synchronous loop; the sender receives data output from the pipeline synchronous loop and sends the data out of the acceleration device, and the receiver receives data sent from outside, feeds the data into the pipeline synchronous loop and directs the data to a target computing core group in the core cluster.

5. The acceleration device architecture for near I/O pipeline computing according to claim 1, wherein the backward step comprises a backward register and P cascaded backward write steps; P is a positive integer;

the backward register is connected to an output end of a previous cascaded step to receive and register intermediate data; one output branch of the backward register is connected to a first backward write step and data is pipelined to a target backward write step by a cascade structure, and the other output branch is directly connected to a next cascaded step and the intermediate data is pipelined to a target step.

6. The acceleration device architecture for near I/O pipeline computing according to claim 5, wherein first write registers in all the backward write steps in the same backward step are cascaded, and data is input by the backward register and pipelined to different backward write steps;

the backward write step comprises at least Q cascaded write registers, and each write register is connected to one computing core group and data is pipelined to a target computing core group in the backward write step.

7. The acceleration device architecture for near I/O pipeline computing according to claim 1, wherein the forward step comprises a forward first-in-first-out cache (FIFO), a forward register, and P groups of forward receive steps and forward write steps; P is a positive integer;

P forward receive steps are cascaded, P forward write steps are cascaded, and the forward write step and the forward receive step in the same group are connected to the same computing core group;

one input end of the forward FIFO is connected to output of a previous cascaded step to receive and register intermediate data, and the other input end is connected to output of the forward receive step at a tail end to receive data output from the forward receive step at the tail end;

output of the forward FIFO is connected to the forward register, and output of the forward register is connected to a first forward write step and pipeline data is directed to a target forward write step by a cascade structure.

8. The acceleration device architecture for near I/O pipeline computing according to claim 7, wherein the forward write step comprises at least Q cascaded write registers, and each write register is connected to one computing core group and data is pipelined to a target computing core group in the forward write step;

the forward receive step comprises at least Q cascaded switch FIFOs, and each switch FIFO is connected to one computing core group, caches intermediate data input by the computing core group and pipelines the intermediate data into the pipeline synchronous loop layer by layer.

9. The acceleration device architecture for near I/O pipeline computing according to claim 8, wherein first write registers in all the forward write steps in the same forward step are cascaded, and data is input by the forward register and pipelined to different forward write steps; switch FIFOs at tail ends of all the forward receive steps in the same forward step are cascaded and intermediate data input by different computing core groups are pipelined into the forward FIFO layer by layer.

10. The acceleration device architecture for near I/O pipeline computing according to claim 8, wherein in the $i^{th}$ forward step and the $M-i+1^{th}$ backward step, the forward write step and the backward write step in the same group have the same structure;

in the forward receive step and the forward write step of the same group in the same forward step, the number of the registers is the same as that of the FIFOs.

11. The acceleration device architecture for near I/O pipeline computing according to claim 8, wherein data directed into the pipeline synchronous loop is provided with a bit identifier, and the forward steps and the backward steps determine, based on a corresponding flag bit of the bit identifier, status and a flow direction of the data;

if the flag bit of the bit identifier indicates that the data is exhausted, the data is directly discarded;

if the flag bit of the bit identifier indicates that the data is not exhausted, the data is fed into the write register layer by layer until the data is directed into a target computing core group.

12. An AI acceleration system, comprising at least two acceleration devices according to claim 1 and a data switching circuit, wherein the at least two acceleration devices are separately connected to several DRAMs, a sender and a receiver connected to a pipeline synchronous loop are provided in the acceleration device, and the sender and the receiver are separately connected to the data switching circuit;

a computing core group in the acceleration device is configured for executing at least one of a matrix operation and a vector operation, the acceleration device at a sending end executes a data accelerating task and sends matrix data and/or vector data to the data switching circuit by the sender, and the acceleration device at a receiving end receives the matrix data and/or the vector data by the receiver and executes a data accelerating task.

\* \* \* \* \*